Patented Aug. 9, 1938

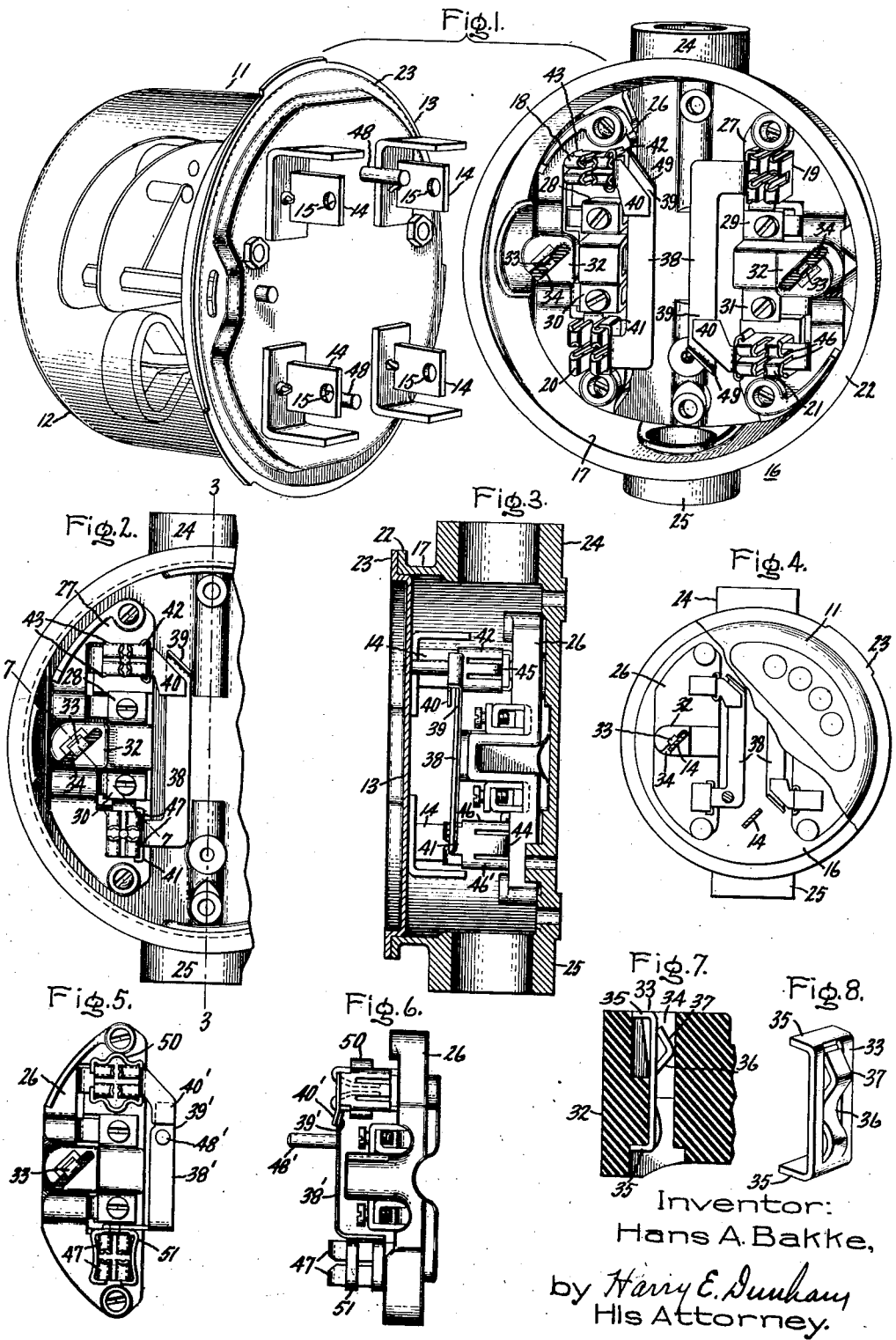

2,126,602

UNITED STATES PATENT OFFICE 2,126,602

ELECTRIC METER MOUNTING

Hans A. Bakke, Swampscott, Mass., assignor to General Electric Company, a corporation of New York Application October 25, 1935, Serial No. 46,726

9 Claims. (Cl. 247—2)

My invention relates to electrical instruments and mountings for such devices. It concerns particularly mounting arrangements for detachable integrating meters.

It is an object of my invention to provide an easily detachable electrical device which is automatically connected into an electrical circuit when it is mounted in place and which automatically closes contacts when the device is removed in order to maintain the continuity of the electrical circuits.

It is another object of my invention to provide a disconnecting arrangement for a detachable electrical device, permitting the device to be mounted in a mounting socket in a way which will cause the electrical circuit to remain open, and permitting the device to be sealed to its socket.

Other and further objects and advantages will become apparent as the description proceeds.

In carrying out my invention in its preferred form as applied specifically to universal detachable integrating meters, I provide any desired type of integrating meter mounted on a base plate with contact prongs extending through the base plate and a socket or receptacle for receiving such a meter with split terminal clips for receiving the contact prongs. The invention is described as applied to an arrangement in which the terminal clips are slotted both lengthwise and crosswise and both the contact prongs and the terminal clips are placed at the corners of a square to permit inserting the meter into the socket in any one of four different relative angular positions, as disclosed in my copending application, Serial No. 20,592, filed May 9, 1935, now Patent No. 2,105,396, granted January 11 1938, and assigned to the same assignee as the present application.

Short-circuiting jumpers are provided between the terminal clips in the meter-receiving socket which connect corresponding contact clips to maintain continuity of service when the meter is removed but are depressed out of engagement when the meter is inserted in the socket to permit the electrical circuits to be completed through the meter windings. An extra pair of diagonally placed insulated clips is provided in the socket to hold the meter in a diagonal position with its prongs out of engagement with the current-carrying terminal clips in order to disconnect the electric service when desired while mounting the meter in a position in which it and the live terminals of the meter socket can be sealed.

The invention will be understood more readily from the following detailed description when considered in connection with the accompanying drawing, and those features of the invention which are believed to be novel and patentable will be pointed out in the claims appended hereto. In the drawing Fig. 1 is a view in perspective of a detachable meter mechanism and a mounting socket adapted to receive the meter mechanism; Fig. 2 is a fragmentary plan view of the socket; Fig. 3 is a vertical section cut by the plane 3—3 shown in Fig. 2; Fig. 4 is a schematic diagram showing the diagonal position of the meter for disconnecting the circuit; Fig. 5 is a plan view of a portion of the meter socket showing a modified form of circuit-closing jumpers; Fig. 6 is a side elevation of the arrangement of Fig. 5; Fig. 7 is a fragmentary view partially in section of the portion of the apparatus cut by the plane 7—7 of Fig. 2 and showing one of the clips for holding the meter in its disconnected position; and Fig. 8 is a detail perspective view of the clip seen in Fig. 7.

While I have illustrated the manner of carrying out my invention in detachable watt-hour meters, it will be understood that my invention is not limited thereto but is applicable to detachable electrical devices of any kind. In the drawing, like reference characters are utilized to designate like parts throughout. In Fig. 1 is shown a watt-hour mechanism 11 of any suitable type, preferably enclosed in a protecting cup-shaped glass case 12 and mounted upon a base plate 13 serving both as a closure for the glass case 12 and as a mounting for the meter mechanism and its contact terminals. The contact terminals of the meter mechanism take the form of flat contact prongs 14 projecting through the base plate 13. The prongs 14 are provided with holes 15 at the ends to facilitate holding the meter mechanism in the disconnecting position.

There is provided also a receptacle or socket 16 for receiving the meter mechanism 11 and comprising a shallow cup-shaped base 17 having mounted therein split terminal clips 18, 19, 20, and 21 adapted to cooperate with the terminal prongs 14. The socket 16 is provided with a flange 22 against which the rim 23 of the base plate 13 is adapted to fit and which is adapted to engage a clamping ring. It will be understood that a suitable clamping ring and sealing arrangement, such as that shown at 12 in Fig. 1 of the United States Patent to Bradshaw et al., No. 1,969,499, for example, may be employed for securing the meter mechanism 11 to the socket 16 and for locking the meter mechanism 11 and the terminal chamber formed by the socket 16. The socket 16 is also provided with nipples 24 and 25, which are adapted to receive conduit containing the conductors (not shown) which constitute the connections through the meter between electric supply lines and the load to be metered.

Moulded insulating blocks 26 and 27 are secured to the bottom wall of the socket 16 for supporting and insulating the terminal clips 18, 19, 20, and 21. Screw terminals 28, 29, 30, and 31 are also mounted upon the insulating blocks 26 and 27 to permit connecting the terminal clips 18, 19, 20, and 21 to the conductors of the electrical circuit in which the electric meter is to be connected. The insulating blocks 26 and 27 have raised central portions 32 serving the dual purpose of insulating baffles between adjacent line terminals and insulating supports for clips 33 holding the meter mechanism 11 when it is in its disconnecting position.

The terminal clips 18, 19, 20, and 21 are slotted to receive the prongs 14 to make the electrical connection through the windings of the meter mechanism 11 when it is in its metering position, illustrated in Fig. 3. The insulating baffles 32, on the other hand, contain diagonal slots 34 to receive two diagonally opposite prongs 14 when the meter mechanism 11 is mounted against the socket 16 in an oblique position with its normally vertical axis turned forty-five degrees from the vertical as shown in Fig. 4. The clips 33, which are composed of resilient strip material, such as brass, are set in the slots 34 as shown in Fig. 7. There is obviously the same angular and spacial relationship between the clips 33 as between the clips 20 and 19. The ends 35 of the clips 33 are bent and the baffles 32 are so shaped as to provide shoulders cooperating with the bent portions 35 in order to hold the clips 33 longitudinally in the slots 34. Furthermore, each clip 33 has a zig-zag tongue 36 resiliently biased out of the plane of the clip 33 to serve the dual purpose of holding the clip 33 against one side of the slot 34 and retaining a contact prong 14 in the slot 34. Each tongue 36 is formed by partially cutting out the central portion of the clip 33 and crimping the tongue thus formed to include a blunted tip or angle portion 37. Each tip 37 is adapted to press resiliently against the side of the corresponding slot 34 away from the remainder of the clip 33 and to engage the hole 15 in a prong 14 of the meter mechanism, thus preventing the meter mechanism from dropping out of the receptacle 16 before a clamping ring is applied to the meter mechanism 11 and the receptacle 16.

In order to avoid leaving the electrical circuit open when the meter mechanism 11 is removed, circuit-closing jumpers 38 may be provided, each of which comprises a deflectable spring contact 39 and a stationary contact 40. When the socket 16 is to be used with conduit running vertically, the jumpers 38 are arranged as shown with deflectable contacts 39 supported by terminal clips 19 and 20 and with stationary contact 40 supported by terminal clips 18 and 21. The circuit-closing jumpers 38 are formed by stamping or cutting strips from resilient sheet material, such as spring brass, and bending to the shape shown. Offset jaws 41 and 42 are produced to secure the jumpers to the terminal clips in the receptacle 16. The jaws 41 of the contact member 39 are adapted to grasp one side of a terminal clip, such as the clip 20, when slipped down on the clip. Likewise, the jaws 42 of the contact 40 are adapted to grasp an end of the terminal clip, such as the clip 18, when slipped down on the clip. Preferably, the edges of the terminal clips are bent outward to form lips 43 in order that the jaws 42 will hold securely to the ends of the terminal clips.

In order to prevent the jaws 41 and 42 from sliding off the terminal clips, tongues 44 and 45 (Fig. 3) may be cut in the jumpers 38 and bent inward slightly to engage the terminal clips frictionally. In the case of the tongue 44, a flat outer surface of the terminal clip is engaged, whereas, in the case of the tongue 45, the edges of the material at the inner portion of the clip (illustrated in Fig. 1 at 46) are engaged. The tongue 44 may be very slightly hooked at the end to slip over the ends of the inner edges 46, thus virtually locking the jaws 42 in position. A locking effect may also be obtained in the case of the jaws 41 by having the middle parts 46' (Fig. 3) of the curved portion bent far enough to tend to catch under the top curved edges 47 of the terminal clips (Fig. 2).

The arrangement is such that, when the meter mechanism 11 is removed, the contacts 39 tend to spring up against the contacts 40, thus maintaining the continuity of the circuits between the terminal clips 18 and 20, and between the clips 19 and 21, through the jumpers 38 instead of through the meter windings.

It will be understood that, if it is desired to arrange the receptacle 16 for horizontally running conduit instead of vertical, then the circuit-closing jumper mounting will be changed accordingly with the terminal clips 20 and 21 connected and the clips 18 and 19 connected, instead of the arrangement shown in the drawing.

Suitable means are provided for depressing the contacts 39 when the meter mechanism 11 is in place. For example, pins 48 of insulating material may be attached to the base plate 13 of the meter mechanism 11. The pins 48 are so positioned that they strike the upturned ends 49 of the contacts 39 when the meter mechanism is in place with the prongs 14 fitting into the terminal clips 18 to 21. The jumper contacts are thus opened, permitting the current to flow through the meter windings.

The construction of the circuit-closing jumpers 38 of Figs. 1 to 3 may be modified as shown in Figs. 5 and 6 by providing supporting portions 50 and 51 which substantially surround the terminal clips and grasp them resiliently. Modified parts in Figs. 5 and 6 corresponding to parts in Figs. 1 to 3 are represented by the same reference numerals primed. If desired, the supporting portion 51 may be riveted to the spring contact member 39' instead of being integral therewith. Instead of mounting insulating pins on the base plate 13 for depressing the spring contacts 39 and 39', insulating pins may be mounted upon the spring blades 39 and 39', themselves, as shown at 48' in Figs. 5 and 6. It will be apparent that, when the meter mechanism 11 is mounted on the receptacle 16, the base plate 13 will strike the pins 48' and depress the spring contacts 39'.

If it is desired to seal the meter mechanism 11 to the receptacle 16 but to have the load conductors disconnected from the current supply lines, this is accomplished by mounting the meter mechanism 11 in the diagonal position of Fig. 4. Two of the prongs 14 are then grasped by the clips 33 to hold the meter in place until a clamping ring is supplied. The meter windings are obviously disconnected and the load-circuit-closing contacts 39' and 40' are held open by reason of the base plate 13 bearing upon the pin 48'. In case no circuit-closing jumpers 38 or 38' are in use, the mere diagonal mounting of the meter mechanism 11 will, of course, also avoid flow of current between supply lines and load. By using the arrangement of Figs. 1 to 3, it is possible to seal the meter mechanism 11 to the receptacle 16 with the meter windings disconnected without interrupting electric service, since the pins 48 depress the contacts 39 only when the meter mechanism 11 is mounted vertically with prongs 14 engaging terminal clips 18 to 21.

I have herein shown and particularly described certain embodiments of my invention and certain methods of operation embraced therein for the purpose of explaining its principle and showing its application but it will be obvious to those skilled in the art that many modifications and variations are possible and I aim, therefore to cover all such modifications and variations as fall within the scope of my invention which is defined in the appended claims.

What I claim as new and desire to secure by Letters Patent of the United States is:

1. A circuit-closing jumper for an electrical device having a plurality of terminals comprising in combination, a stationary contact having offset means grasping one of said terminals, a yieldable strip having offset means grasping another of said terminals, extending toward said stationary contact and resiliently engaging it, but being yieldable to disengage said stationary contact.

2. A circuit-closing jumper for an electrical device having a plurality of split terminals formed from strip material, comprising in combination, a stationary contact having offset jaws for grasping the side of one of said terminals, a yieldable strip having offset jaws for grasping a side of another of said terminals, said strip extending toward said stationary contact and resiliently engaging it, but being yieldable to disengage said stationary contact.

3. A detachable electrical instrument comprising in combination, an instrument mechanism having a plurality of terminal contacts and a receptacle for receiving said instrument comprising in combination, a base, a plurality of terminal contacts mounted thereon adapted to cooperate with the contacts on said instrument mechanism when said instrument and receptacle are brought together in a predetermined normal angular relation, and a plurality of insulated clips mounted on said base adapted to hold contacts of said instrument mechanism when said instrument mechanism and receptacle are brought together in an oblique angular relation with respect to normal, said terminal contacts and said clips being so positioned that all of said contacts are out of engagement with corresponding contacts when said instrument mechanism is in the oblique angular relation.

4. A receptacle for a detachable electric device with two pairs of terminals arranged at the corners of a square, said receptacle comprising in combination, a base, four terminal clips mounted thereon at the four corners of a square, and a pair of insulated clips mounted on said base on the circumference of a circle circumscribed on said square at opposite ends of a diameter of said circle and adapted to receive a pair of diagonally opposite terminals of the electric device.

5. A receptacle for a detachable electric device with a plurality of terminals, said receptacle comprising in combination, a base, a plurality of circuit connected terminal clips mounted thereon adapted to cooperate with the terminal clips on the detachable electric device, and insulated terminal clips mounted on said base and angularly displaced from corresponding circuit connected terminal clips of said receptacle but having the same angular and spacial relationship to each other as the corresponding circuit connected terminal clips of said receptacle.

6. A detachable electric instrument comprising in combination, an instrument mechanism having a set of terminal contacts and a receptacle for receiving said instrument mechanism comprising in combination, a base, a set of circuit connected terminal contacts mounted thereon to cooperate with the contacts of said instrument mechanism when said mechanism and said receptacle are brought together in a predetermined normal angular relation, a circuit-closing jumper adapted to connect a pair of said receptacle terminals when said mechanism and receptacle are separated having means engageable by said instrument mechanism to interrupt said connection when said mechanism and receptacle are brought together, and insulated terminal clips mounted on said base and adapted to hold contacts of said mechanism when said mechanism and said receptacle are brought together in an oblique angular relation with respect to normal, said terminal contacts and said terminal clips being so positioned that all of said contacts are out of engagement with corresponding contacts when said instrument mechanism is in the oblique angular relation.

7. A circuit-closing jumper for an electrical device having a plurality of split terminals formed from strip material, comprising in combination, a stationary contact having a resilient supporting portion substantially surrounding one of said terminals, a yieldable strip having a resilient supporting portion substantially surrounding another of said terminals, said strip extending toward said stationary contact and resiliently engaging it, but being yieldable to disengage said stationary contact.

8. A detachable electrical instrument comprising in combination, an instrument mechanism having two pairs of terminal contacts arranged at the corners of a square, and a receptacle for receiving said instrument comprising in combination, a base, four terminal contacts mounted thereon at the four corners of a square adapted to cooperate with the contacts on said instrument mechanism when said instrument and receptacle are brought together in a predetermined normal angular relation, and a pair of insulated clips mounted on said base on the circumference of a circle circumscribed on said square, said clips being at the opposite ends of a diameter of said circle and adapted to receive a pair of diagonally opposite terminal contacts of the instrument mechanism.

9. A detachable electrical instrument comprising in combination, an instrument mechanism having two pairs of terminals arranged at the corners of a square, and a receptacle for receiving said instrument mechanism having four terminal contacts mounted thereon at the four corners of a square adapted to cooperate with the terminal contacts on said instrument mechanism, means adapted to connect electrically a pair of said terminal contacts, said means having a member engageable by the instrument mechanism to break the connection when said instrument and receptacle are brought together, said receptacle including a pair of insulated clips mounted on said base on the circumference of a circle circumscribed on the square defined by the positions of the terminal contacts, said insulated clips being at the opposite ends of a diameter of said circle and being adapted to receive a pair of diagonally opposite terminal contacts of the instrument mechanism.

HANS A. BAKKE.